(12) United States Patent
Sadakane

(10) Patent No.: US 10,948,719 B2
(45) Date of Patent: Mar. 16, 2021

(54) INSPECTION DEVICE AND INSPECTION METHOD

(71) Applicant: AGC Inc., Chiyoda-ku (JP)

(72) Inventor: Shunsuke Sadakane, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 245 days.

(21) Appl. No.: 16/150,908

(22) Filed: Oct. 3, 2018

(65) Prior Publication Data

US 2019/0033588 A1 Jan. 31, 2019

Related U.S. Application Data

(63) Continuation of application No. PCT/JP2017/013945, filed on Apr. 3, 2017.

(30) Foreign Application Priority Data

Apr. 14, 2016 (JP) .............................. JP2016-081531

(51) Int. Cl.
  *G02B 27/01* (2006.01)
  *B60K 35/00* (2006.01)
  *G01M 11/00* (2006.01)

(52) U.S. Cl.
  CPC .......... *G02B 27/0103* (2013.01); *B60K 35/00* (2013.01); *G01M 11/00* (2013.01);
  (Continued)

(58) Field of Classification Search
  CPC ............ G02B 27/0103; G02B 27/0101; G02B 2027/011; G02B 2027/0138;
  (Continued)

(56) References Cited

U.S. PATENT DOCUMENTS 5,422,812 A 6/1995 Knoll et al.
5,510,913 A 4/1996 Hashimoto et al.
(Continued)

FOREIGN PATENT DOCUMENTS

DE   10 2005 037 797 A1    2/2007
DE      102005037797 A1 *  2/2007  ............. B60K 35/00
(Continued)

OTHER PUBLICATIONS

International Search Report dated Jun. 20, 2017 in PCT/JP2017/013945, filed on Apr. 3, 2017 (with English Translation).
(Continued)

*Primary Examiner* — Jade R Chwasz
(74) *Attorney, Agent, or Firm* — Element IP, PLC

(57) ABSTRACT

An inspection device for inspecting a virtual image for a head-up display device, includes a windshield; a display unit for generating an image and projecting the image onto the windshield without using a concave mirror; an imaging unit for capturing a virtual image of the image; a storage unit for storing data of a shape of the windshield and a relative position between the windshield, the display unit, and the imaging unit; an imaging unit position control unit for moving the imaging unit to a predetermined position; a display control unit for calculating an image distortion correction due to the concave mirror, based on the data corresponding to a position of the imaging unit after moving, and for controlling the display unit to generate the image taking into account the image distortion correction; and an image inspection unit for inspecting a distortion of the virtual image.

19 Claims, 3 Drawing Sheets

(52) U.S. Cl.
CPC .. *G02B 27/0101* (2013.01); *B60K 2370/1529* (2019.05); *B60K 2370/21* (2019.05); *B60K 2370/334* (2019.05); *B60K 2370/92* (2019.05); *G02B 2027/011* (2013.01); *G02B 2027/014* (2013.01); *G02B 2027/0138* (2013.01)

(58) Field of Classification Search
CPC .............. G02B 2027/014; G02B 27/01; G02B 27/0179; G02B 27/0081; B60K 35/00; B60K 2370/1529; B60K 2370/21; B60K 2370/92; B60K 2370/334; B60K 2370/152; B60K 2370/31; G01M 11/00
See application file for complete search history.

(56) References Cited

U.S. PATENT DOCUMENTS

| | | | |
|---|---|---|---|
| 8,711,485 B2 | 4/2014 | Schliep et al. | |
| 8,711,486 B2 | 4/2014 | Tsimhoni et al. | |
| 2005/0219522 A1 | 10/2005 | Jones | |
| 2016/0377776 A1 | 12/2016 | Ichihashi | |

FOREIGN PATENT DOCUMENTS

| | | |
|---|---|---|
| JP | 3-505489 | 11/1991 |
| JP | 6-40271 | 2/1994 |
| JP | 2008-209212 | 9/2008 |
| JP | 2009-262666 | 11/2009 |
| JP | 2015-75381 | 4/2015 |
| JP | 2015-87512 | 5/2015 |
| JP | 2015-87698 | 5/2015 |
| WO | WO 2015/141759 A1 | 9/2015 |
| WO | WO 2016/042838 A1 | 3/2016 |

OTHER PUBLICATIONS

Written Opinion dated Jun. 20, 2017 in PCT/JP2017/013945, filed on Apr. 3, 2017.

\* cited by examiner

INSPECTION DEVICE AND INSPECTION METHOD

CROSS-REFERENCE TO RELATED APPLICATION

The present application is a continuation application filed under 35 U.S.C. 111(a) claiming benefit under 35 U.S.C. 120 and 365(c) of PCT International Application No. PCT/JP2017/013945 filed on Apr. 3, 2017 and designating the U.S., which is based on and claims priority of Japanese application No. 2016-081531 filed on Apr. 14, 2016. The entire contents of the foregoing applications are incorporated herein by reference.

BACKGROUND OF THE INVENTION

1. Field of the Invention

The disclosure herein generally relates to an inspection device and an inspection method.

2. Description of the Related Art

A head-up display device (in the following, referred to as a HUD device) is a device, which is installed in a vehicle, that enlarges an image generated from a display unit by using a concave mirror, projects the enlarged image onto a windshield of the vehicle, and causes the windshield to display a virtual image of the image so that a driver can view the virtual image from an inside of the vehicle. In order to enhance a visibility for viewing the virtual image by the driver, it is important to inspect a quality of the final image that is the virtual image.

Because in the HUD device, an image is projected via the concave mirror, the quality of the final image is typically inspected by using a unit including a concave mirror (See, for example, Japanese Unexamined Patent Application Publication No. 2015-75381). However, the unit including the concave mirror makes the configuration of the device extensive. Thus, a simple inspection device without using the unit including the concave mirror has been desired.

When an image is projected onto a windshield without using the concave mirror, an image for some fixed eye point coincides with an image via the concave mirror. However, in the case of moving the eye point, an image for the eye point does not coincide with the image via the concave mirror. Thus, there is concern that an accuracy of inspection may be reduced.

SUMMARY OF THE INVENTION

Technical Problem

The present invention was made in view of such a problem, and it is an object of the present invention to enhance an inspection accuracy in an inspection device for inspecting a final image from a HUD device without using a concave mirror.

Solution to Problem

According to an aspect of the present invention, there is provision for an inspection device for inspecting a virtual image for a head-up display device, the head-up display device enlarging an image output from a display unit by using a concave mirror, projecting the enlarged image onto a windshield of a vehicle, and causing the windshield to display a virtual image of the image so as to be viewed from an inside of the vehicle, that includes
a windshield;
a display unit configured to generate an image and project the image onto the windshield without using a concave mirror;
an imaging unit configured to capture a virtual image of the image projected on the windshield;
a storage unit configured to store data of a shape of the windshield and a relative position between the windshield, the display unit, and the imaging unit, the data being preliminarily set;
an imaging unit position control unit configured to cause the imaging unit to move to a predetermined position;
a display control unit configured to calculate an image distortion correction due to the concave mirror, based on the data corresponding to a position of the imaging unit after moving, and control the display unit so as to generate the image taking into account the image distortion correction; and
an image inspection unit configured to inspect a distortion of the virtual image captured by the imaging unit.

Advantageous Effect of Invention

According to an aspect of the present invention, in an inspection device for inspecting a final image of a HUD device without using a concave mirror, an inspection accuracy can be enhanced.

BRIEF DESCRIPTION OF THE DRAWINGS

Other objects and further features of embodiments will become apparent from the following detailed description when read in conjunction with the accompanying drawings, in which.

DETAILED DESCRIPTION OF THE PREFERRED EMBODIMENTS

Figure 1:
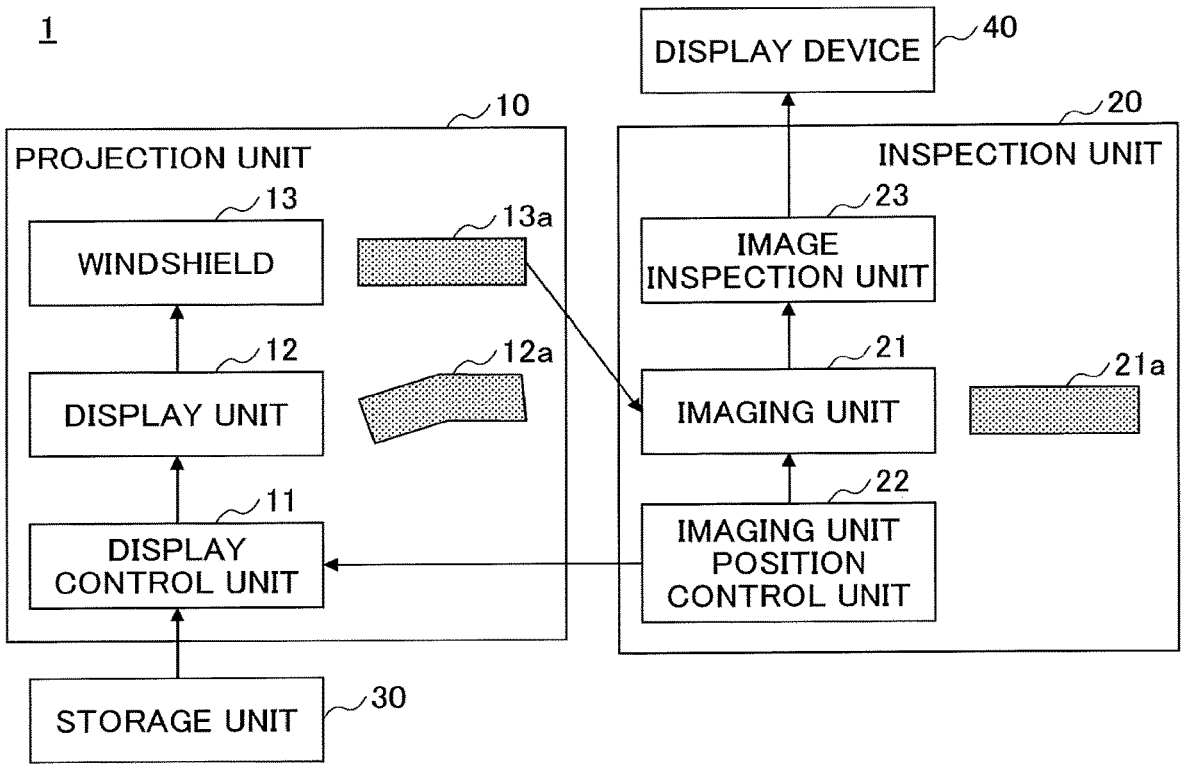
FIG. 1 is a block diagram depicting an example of an inspection device according to an embodiment.

In the following, with reference to drawings, embodiments of the present invention will be described. In each drawing, the same reference numeral is assigned to the same component, and redundant explanation will be omitted.

[Outline of Inspection Device]

Figure 2:
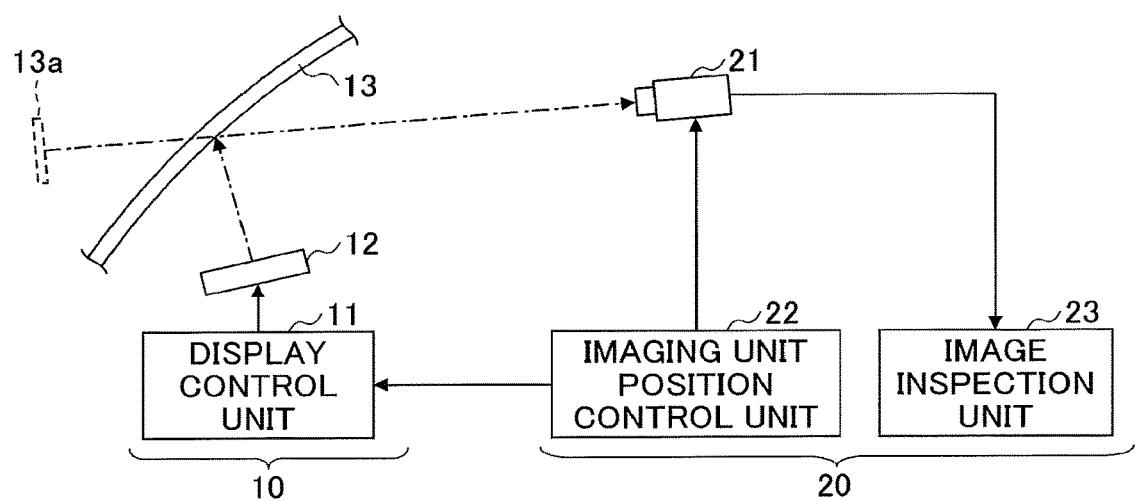
FIG. 2 is a diagram schematically depicting an example of the inspection device according to the embodiment.

FIG. 1 is a block diagram depicting an example of an inspection device according to an embodiment. FIG. 2 is a diagram schematically depicting an example of the inspection device according to the embodiment. FIG. 2 shows only a part of the components illustrated in FIG. 1.

Referring to FIG. 1 and FIG. 2, an inspection device 1 is a device for inspecting a distortion in a final image from a HUD device without using a concave mirror, including a projection unit 10, an inspection unit 20, a storage unit 30 and a display device 40. The inspection device 1 can inspect a reflected double image as necessary. However, the display device 40 is an option, and the inspection device 1 may not be provided with the display device 40. In the following, the inspection device 1 will be described in detail.

The projection unit 10 includes a display control unit 11, a display unit 12 and a windshield 13.

The display control unit 11 calculates an image to be displayed on the display unit 12, and controls the display unit 12 to display the calculated image. The display control unit 11 is connected to the storage unit 30, and can acquire information required for inspection from the storage unit 30. For the storage unit 30, for example, a semiconductor such as a flash memory, a hard disk, or an optical disk can be used.

The information required for inspection includes, for example, a shape of the windshield 13, a relative position between the windshield 13 and the HUD device, or an optical system in the HUD device, and so on. Note that the information on the shape of the windshield 13 includes curvatures of the windshield 13 in the vertical direction and in the horizontal direction, an installation angle to a vehicle, a cross-sectional shape (flat or wedge shape), or the like.

The display unit 12 generates an image 12a under the control of the display control unit 11, and projects the image 12a on the windshield 13. The image 12a is directly projected onto the windshield 13 without using the concave mirror. However, the image 12a may be projected onto the windshield 13 via an optical element that does not generate distortion such as a flat mirror. For the display unit 12, for example, a liquid crystal panel can be used.

The image 12a can be, for example, an image that causes to display a desired geometric shape suitable for an inspection as a virtual image. In the following, as an example, a rectangle will be displayed as the virtual image. In this case, with a distortion of the virtual image generated due to the shape of the windshield 13, the image 12a is an image in which a reverse distortion is intentionally given to a rectangle, as illustrated in FIG. 1.

The windshield 13 is a member, on which the image 12a generated by the display unit 12 is projected. The image 12a projected onto the windshield 13 can be viewed as a final image 13a (virtual image) from a predetermined position. In the image 12a, a distortion generated by the windshield 13 and the reverse distortion cancel each other, and the final image 13a (virtual image) having a rectangular shape is viewed.

The inspection unit 20 includes an imaging unit 21, an imaging unit position control unit 22, and an image inspection unit 23.

The imaging unit 21 captures the final image 13a (virtual image) of the image 12a projected onto the windshield 13, as a captured image 21a. The imaging unit 21 is configured so that a capturing direction can be adjusted at a desired angle in a horizontal plane and in a vertical plane, in order to capture the final image 13a. Moreover, the imaging unit 21 is configured so as to be movable back-and-forth, horizontally and vertically. Note that the capturing direction corresponds to a line of sight of a driver of a vehicle in an actual use. For the imaging unit 21, for example, a CCD (Charge-Coupled Device) camera or a CMOS (Complementary Metal-Oxide-Semiconductor) camera can be used.

The imaging unit position control unit 22 controls the imaging unit 21 at a predetermined position (including an angle). The imaging unit position control unit 22 controls the imaging unit 21 at a position, from which the final image 13a can be captured. The image inspection unit 23 inspects a distortion of the captured image 21a (i.e. final image 13a), and can inspect a reflected double image as necessary.

For the display device 40, for example, a liquid crystal display or an organic EL display can be used.

Figure 3:
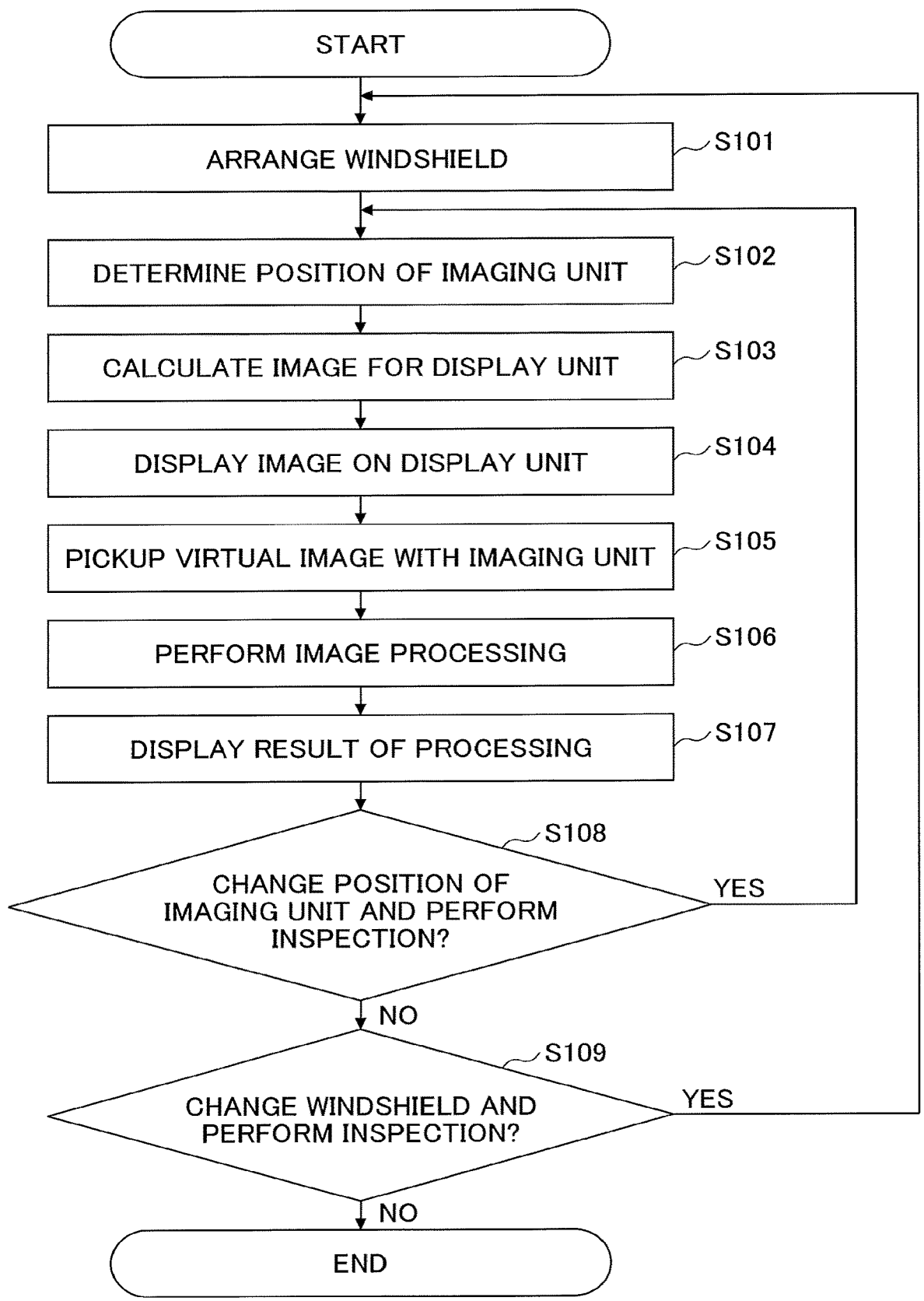
FIG. 3 is a flowchart depicting an example of an inspection method using the inspection device according to the embodiment.

FIG. 3 is a flowchart depicting an example of an inspection method using the inspection device according to the embodiment. First, the windshield 13 (WS) is arranged so that the windshield 13 and the display unit 12 have a predetermined relative position (step S101). Because a relative position in an actual use between the windshield 13 and the HUD device is determined for each vehicle type, in the following, the windshield 13 is arranged at a predetermined position so that the relative position between the windshield 13 and the display unit 12 corresponds to the above-described relative position in the actual use. The windshield 13 can be carried, for example, by being loaded on a belt conveyer, and arranged at a predetermined position by using a robot. However, the present invention is not limited to this.

Note that the display unit 12 may be configured so as to be movable, and a display unit moving unit for controlling a position of the display unit 12 may be provided. In this case, the display unit moving unit reads out data indicating the relative position between the windshield 13 and the display unit 12 and data indicating the position of the imaging unit 21, stored in the storage unit 30, and controls the position of the display unit 12 based on the read out data. According to the above-described configuration, the position of the display unit 12 can be fine-tuned so that the windshield 13 arranged at the predetermined position and the display unit 12 have a regular relative position.

Next, the imaging unit position control unit 22 moves the imaging unit 21 to a predetermined position (positioning), at which the final image 13a can be captured (step S102). Specifically, the imaging unit position control unit 22 reads out data indicating a relative position between the windshield 13, the display unit 12, and the imaging unit 21, stored in the storage unit 30, and controls the position of the imaging unit 21 based on the read out data. A position, at which the imaging unit 21 is to be arranged, corresponds to an eye point position of the driver in an actual use.

Next, the display control unit 11 calculates an image distortion correction due to the concave mirror corresponding to the position of the imaging unit 21 after moving at step S102 based on the data read out from the storage unit 30 (i.e. based on the shape of the windshield 13, and the relative position between the windshield 13, the display unit 12, and the imaging unit 21 after moving), and calculates the image 12a including the image distortion correction (step S103). The display control unit 11 can calculate the image 12a including an image distortion correction by tracing a light beam, for example.

Note that the optical system of the HUD device including the concave mirror has a role of correcting a distortion of a virtual image generated due to the shape of the windshield. The image distortion correction calculated at step S103 corresponds to the distortion correction by the optical system of the HUD device including the concave mirror. When the eye point position of the driver in an actual use is changed, a value of the distortion correction is also changed. Thus, in the inspection device 1, when the position of the imaging unit 21 is moved, the image distortion correction corresponding to the position of the imaging unit 21 after moving is required to be calculated again.

Next, the display control unit 11 controls the display unit 12, to generate an image 12a taking into account the image distortion correction calculated at step S103 and to project the image 12a onto the windshield 13 without using the concave mirror (step S104). The image 12a is projected onto the windshield 13, to become a final image 13a that is a virtual image. Note that the display unit 12 may be moved corresponding to the position of the imaging unit 21, as necessary.

Next, the final image 13a projected on the windshield 13 (virtual image of the image 12a) is captured by the imaging unit (step S105).

Next, the image inspection unit 23 inspects a distortion of the captured image 21a (final image 13a) captured by the imaging unit 21 (step S106). The image inspection unit 23, for example, acquires information on the captured image 21a and analyzes light reception data for each pixel by an image processing, and thereby inspects the distortion of the final image 13a. The image inspection unit 23 can inspect a reflected double image by analyzing the light reception data for each pixel by the image processing, if necessary.

Next, the display device 40 displays the virtual image and results of the inspection by the image inspection unit 23 (graph or values of a distortion or a reflected double image) (step S107). Thus, the inspection for the final image 13a at a position of the imaging unit 21 corresponding to one of eye point positions of the driver is completed.

Next, the inspection unit 20 determines whether to change the position of the imaging unit 21 to perform the inspection (step S108). In the case of changing the position of the imaging unit 21 to perform the inspection, the process moves to step S102, and the same processing as above is repeated.

Note that, in the HUD device, when the eye point position of the driver is changed, a position at which a light from the display unit enters the concave mirror is changed. That is, in the case of changing the position of the imaging unit 21 to perform the inspection, at step S104, a position of the image 12a generated by the display unit 12 is required to be changed corresponding to the position of the imaging unit 21. When a size of the display unit 12 is great, the image 12a may be moved in the display unit 12. However, when the size of the display unit 12 is small, the display unit 12 itself may be moved (including the case of inclining the display unit 12).

In the case of not changing the position of the imaging unit 21 to perform the inspection, the process moves to step S109. For example, an input unit for inputting a measurement condition from outside is arranged in the inspection unit 20, and an operator of the inspection device 1 inputs a number of inspections (number of positions of the imaging unit 21 for performing the inspection) via the input unit in advance. The processes from step S102 to step S108 are repeated until the inspection unit 20 determines that a number of inspections reaches the number of inspections input via the input unit.

Next, the inspection unit 20 determines whether to replace the windshield 13 (WS) by another WS to perform the inspection (step S109). When the windshield 13 is replaced to perform the inspection, the process moves to step S101, and the same processing as above is repeated. When the windshield 13 is not replaced to perform the inspection, the entire inspection processes are completed. For example, an input unit for inputting a measurement condition from outside is arranged in the inspection unit 20, and the operator of the inspection device 1 inputs a number of windshields to be inspected in advance. The processes from step S101 to step S109 are repeated until the inspection unit 20 determines that a number of windshields reaches the number of windshields input via the input unit.

Because when the eye point position of the driver is changed, a quality of the final image 13a is also changed, by changing the position of the imaging unit 21 sequentially to different positions (moving) to perform the inspection, the quality of the final image 13a can be inspected in the case where the eye point position of the driver is changed.

Figure 4:
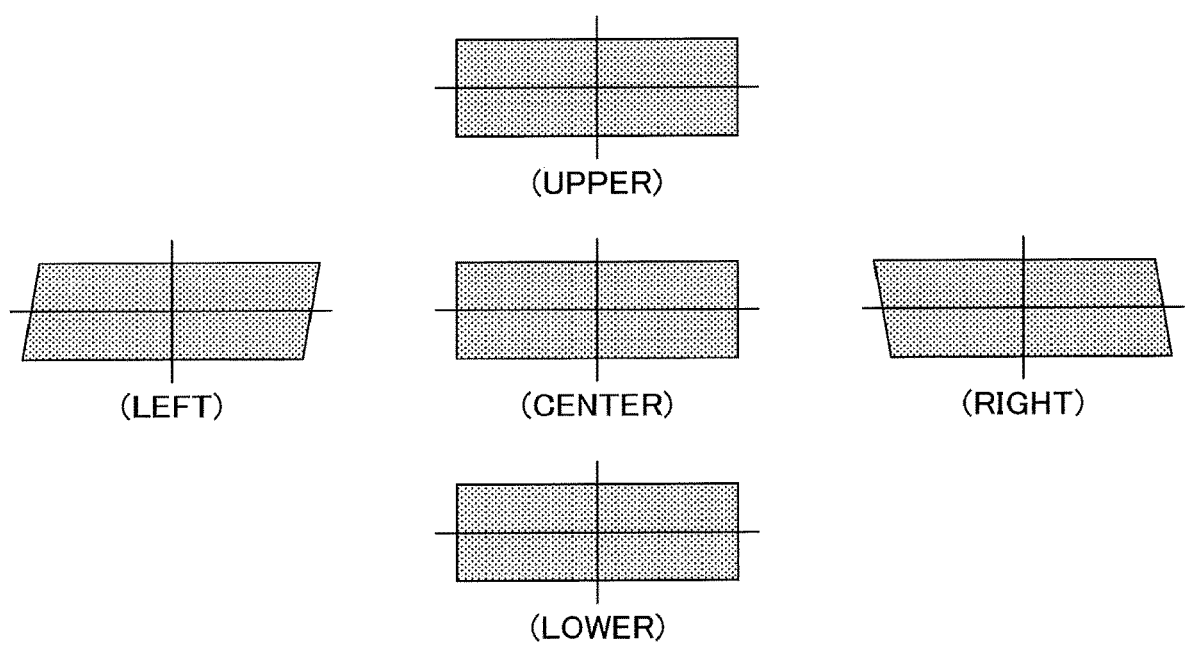
FIG. 4 is a diagram depicting an example of images (virtual images) containing a distortion generated by a concave mirror, when an eye point of a driver is changed.

In the HUD device, when the eye point position of the driver is changed, the position at which a light from the display unit enters the concave mirror is changed, and the distortion caused by the concave mirror is also changed. FIG. 4 is a diagram depicting an example of an image (virtual image) containing a distortion caused by the concave mirror, in the case where an eye point of the driver is changed. In the example illustrated in FIG. 4, in the case where the eye point position of the drive is present at the center, and where the eye point position moves from the center in the vertical direction, a large distortion does not occur. In contrast, when the eye point position of the driver moves from the center in the horizontal direction, a relatively large distortion in a parallelogram shape occurs.

In the inspection device 1 which does not have a concave mirror, when the position of the imaging unit 21 is changed, an image distortion correction is calculated by the display control unit 11, corresponding to the position of the imaging unit 21 after moving. Then, the display unit 12 generates an image, in which the image distortion correction is performed corresponding to the position of the imaging unit 21 after moving. At this time, a position of an image in the display unit 12 is moved, as necessary. For example, in the case where the imaging unit is present at a position corresponding to a center of a driver's visual line, a large distortion does not occur. When the imaging unit is present at a position corresponding to left or right of the driver's visual line, a relatively large distortion in a parallelogram shape occurs, as illustrated in FIG. 4.

According to the above-described configuration, even when the position of the imaging unit 21 is changed, an image, in which the same image distortion correction as the case of having the concave mirror is performed, can be displayed. Thus, an accurate inspection can be performed.

As described above, the preferred embodiments and the like have been described in detail. However, the present invention is not limited to the above-described specific embodiments, and various variations and modifications may be added without deviating from the scope of the present invention to the aforementioned embodiments.

For example, the aforementioned embodiments are described, supposing that the windshield is a front windshield. However, the present invention is not limited to this, and the windshield may be a glass other than the front windshield.

REFERENCE SIGNS LIST 1 inspection device
10 projection unit
11 display control unit
12 display unit
12a image
13 windshield
13a final image
20 inspection unit
21 imaging unit
22 imaging unit position control unit
23 image control unit
30 storage unit
40 display device

What is claimed is:

1. An inspection device for inspecting a virtual image generated from a head-up display device comprising a concave mirror, the inspection device comprising:
   a display unit configured to generate an image and project the image onto a windshield without using a concave mirror;
   an imaging unit configured to capture a virtual image of the image generated and projected on the windshield by the display unit of the inspection device;
   a storage unit configured to store preliminarily set data of a shape of the windshield and a relative position between the windshield, the display unit of the inspection device, and the imaging unit;
   an imaging unit position control unit configured to move the imaging unit to a predetermined position;
   a display control unit configured to calculate an image distortion correction, which corresponds to distortion correction made by the concave mirror of the head-up display device, based on data corresponding to a position of the imaging unit after moving, and to control the display unit of the inspection device so as to generate the image taking into account the image distortion correction; and
   an image inspection unit configured to inspect a distortion of the virtual image captured by the imaging unit.

2. The inspection device according to claim 1, wherein the image inspection unit also inspects a reflected double image of the virtual image captured by the imaging unit.

3. The inspection device according to claim 1, further comprising:
   a display unit moving unit configured to move the display unit of the inspection device to a predetermined position.

4. The inspection device according to claim 1, further comprising:
   a display device configured to display an inspection result by the image inspection unit.

5. The inspection device according to claim 1, wherein the image generated by the display unit of the inspection device is directly projected onto the windshield without using an optical system including a concave mirror.

6. The inspection device according to claim 1, wherein the display control unit is connected to the storage unit.

7. The inspection device according to claim 1, wherein the image generated by the display unit of the inspection device is projected onto the windshield via an optical element that does not generate distortion.

8. The inspection device according to claim 7, wherein the optical element that does not generate distortion is a flat mirror.

9. The inspection device according to claim 1, wherein the image generated by the display unit of the inspection device is a distorted image generated by imposing a reverse distortion.

10. The inspection device according to claim 9, wherein a distortion generated by the windshield and the reverse distortion cancel each other, thereby generating the virtual image captured by the imaging unit.

11. The inspection device according to claim 1, wherein the imaging unit is configured to move back-and-forth horizontally and vertically.

12. The inspection device according to claim 1, wherein the imaging unit is configured so as to adjust a capturing direction at a desired angle in a horizontal plane and in a vertical plane.

13. The inspection device according to claim 12, wherein the capturing direction corresponds to a line of sight of a driver of a vehicle in an actual use.

14. An inspection method using an inspection device for inspecting a virtual image generated from a head-up display device comprising a concave mirror, the method comprising:
   a) arranging a windshield and a display unit of the inspection device in a predetermined relative position;
   b) moving an imaging unit to a predetermined position;
   c) calculating an image distortion correction, which corresponds to distortion correction made by the concave mirror of the head-up display device, based on a shape of the windshield and a relative position between the windshield, the display unit of the inspection device, and the imaging unit after moving;
   d) generating, by the display unit of the inspection device, an image taking into account the image distortion correction and projecting the image onto the windshield without using a concave mirror;
   e) capturing, by the imaging unit, a virtual image of the image projected onto the windshield; and
   f) inspecting, by an image inspection unit, a distortion of the virtual image captured by the imaging unit.

15. The inspection method according to claim 14, further comprising:
   g) inspecting a reflected double image of the virtual image captured by the imaging unit.

16. The inspection method according to claim 14, wherein the predetermined position to which the imaging unit is moved corresponds to an eye position of a driver in an actual use.

17. The inspection method according to claim 14, further comprising:
   h) displaying, by a display device, the virtual image and an inspection result obtained from the image inspection unit.

18. The inspection method according to claim 14, further comprising:
   i) changing the predetermined position of the imaging unit to a new predetermined position and moving the imaging unit to the new predetermined position; and
   j) repeating c) to f).

19. The inspection method according to claim 14, further comprising:
   k) replacing the windshield with a new windshield; and
   l) repeating a) to f) using the new windshield.

* * * * *